United States Patent
Wang et al.

(10) Patent No.: US 8,645,951 B2
(45) Date of Patent: *Feb. 4, 2014

(54) SUPPORTING HETEROGENEOUS VIRTUALIZATION

(75) Inventors: Yun Wang, Shanghai (CN); Yaozu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/327,852

(22) Filed: Dec. 16, 2011

(65) Prior Publication Data

US 2012/0089982 A1    Apr. 12, 2012

Related U.S. Application Data

(63) Continuation of application No. 11/660,187, filed as application No. PCT/CN2006/000564 on Mar. 30, 2006, now Pat. No. 8,099,730.

(51) Int. Cl.
*G06F 9/455* (2006.01)
*G06F 12/00* (2006.01)
*G06F 9/00* (2006.01)

(52) U.S. Cl.
USPC ............................ 718/1; 711/6; 711/2; 713/2

(58) Field of Classification Search
None
See application file for complete search history.

(56) References Cited

U.S. PATENT DOCUMENTS

| | | | |
|---|---|---|---|
| 5,890,189 A * | 3/1999 | Nozue et al. ................... 711/100 |
| 6,725,289 B1 * | 4/2004 | Waldspurger et al. ............ 710/9 |
| 6,802,063 B1 * | 10/2004 | Lee ................................... 718/1 |
| 6,895,491 B2 | 5/2005 | Kjos et al. |
| 6,907,510 B2 | 6/2005 | Bennett et al. |
| 7,260,702 B2 | 8/2007 | Vega et al. |
| 7,330,942 B2 | 2/2008 | Dinechin et al. |
| 7,363,463 B2 * | 4/2008 | Sheu et al. ..................... 711/203 |
| 7,539,986 B2 | 5/2009 | Grobman |
| 7,552,426 B2 | 6/2009 | Traut |
| 7,552,436 B2 * | 6/2009 | Brice et al. .................... 718/104 |
| 7,689,987 B2 | 3/2010 | Neil |
| 2003/0188122 A1 * | 10/2003 | Bennett et al. ................ 711/202 |
| 2004/0064668 A1 * | 4/2004 | Kjos et al. ..................... 711/202 |
| 2005/0081199 A1 * | 4/2005 | Traut ................................ 718/1 |

FOREIGN PATENT DOCUMENTS

WO    2007115425 A1    10/2007

OTHER PUBLICATIONS

International Search Report and Written Opinion dated Jan. 11, 2007 issued in Application No. PCT/CN2006/000564, 6 pages.
International Preliminary Report on Patentability dated Sep. 30, 2008 issued in Application No. PCT/CN2006/000564, 4 pages.

(Continued)

*Primary Examiner* — Camquy Truong
(74) *Attorney, Agent, or Firm* — Trop, Pruner & Hu, P.C.

(57) ABSTRACT

Machine-readable media, methods, apparatus and system are described. In some embodiments, a virtual machine monitor of a computer platform may comprise a service virtual machine created by the virtual machine monitor partitioning an underlying hardware machine to support execution of a plurality of overlying guest operating systems, wherein the plurality of guest operating systems comprise a guest operating system complying with a non-native guest system architecture different from a host system architecture with which the hardware machine complies. The service virtual machine may further comprise a translation layer to translate instructions from the guest operating system complying with the non-native guest system architecture into instructions complying with the host system architecture.

14 Claims, 9 Drawing Sheets

(56) References Cited

OTHER PUBLICATIONS

Barham, et al. "Xen and the Art of Virtualization," University of Cambridge Computer Laboratory, SOSP '03, Oct. 19-22, 2003 Bolton Landing, New York, 14 pages.

Bellard, "QEMU, a Fast and Portable Dynamic Translator," USENIX Association, FREENIX Track: 2005 USENIX Annual Technical Conference (www.usenix.org/events/usenix05/tech/freenix/full-papers/bellard/bellard.,pdf), 6 pages.

Dunlap et al. "ReVirt: Enabling Intrusion Analysis Through Virtual-Machine Logging and Replay," Proceedings of the 2002 Symposium on Operating Systems Design and Implementation (OSDI), vol. 36, Issue S1, Winter 2002, 14 pages.

Nanda, "Virtualization," CSE 501, Fall 2005 (.ecsl.cs.sunysb.edu/~susanta/slides/Lec502-Virt.ppt), 8 pages.

Transitive Corporation, Los Gatos, CA, "Quick Transit Overview," copyright 2004, 2 pages.

\* cited by examiner

Native logical address complying with the
host system architecture

Intermediate address complying with the host system
architecture

| Non-native device port | Native memory address |
|---|---|
| Keyboard port | xxxx |
| Mouse port | xxxx |
| . . . | . . . |

| Non-native memory address | Native memory address |
|---|---|
| YYYY | xxxx |
| YYYY | xxxx |
| . . . | . . . |

SUPPORTING HETEROGENEOUS VIRTUALIZATION

This application is a continuation of U.S. patent application Ser. No. 11/660,187, now U.S. Pat. No. 8,099,730, filed on Feb. 13, 2007, which claims priority to PCT China application number PCT/CN2006/000564, filed on Mar. 30, 2006.

BACKGROUND

A virtual machine (VM) architecture logically partitions a physical machine, such that the underlying hardware of the machine is time-shared and appears as one or more independently operation virtual machines. A computer platform in a virtual machine environment may comprise a virtual machine monitor (VMM) that may create a plurality of virtual machines and runs on the computer platform to facilitate for other software the abstraction of one or more virtual machines.

A homogeneous virtualization platform may comprise a plurality of virtual machines in which all of the virtual machines comply with host system architecture that the underlying hardware machine supports. The term 'system architecture' may comprise a set of registers, data structures, and instructions designed to support basic system-level operations such as memory management, interrupt and exception handling, task management and control of multiple processors, possibly other tasks.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for supporting a heterogeneous virtualization platform. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
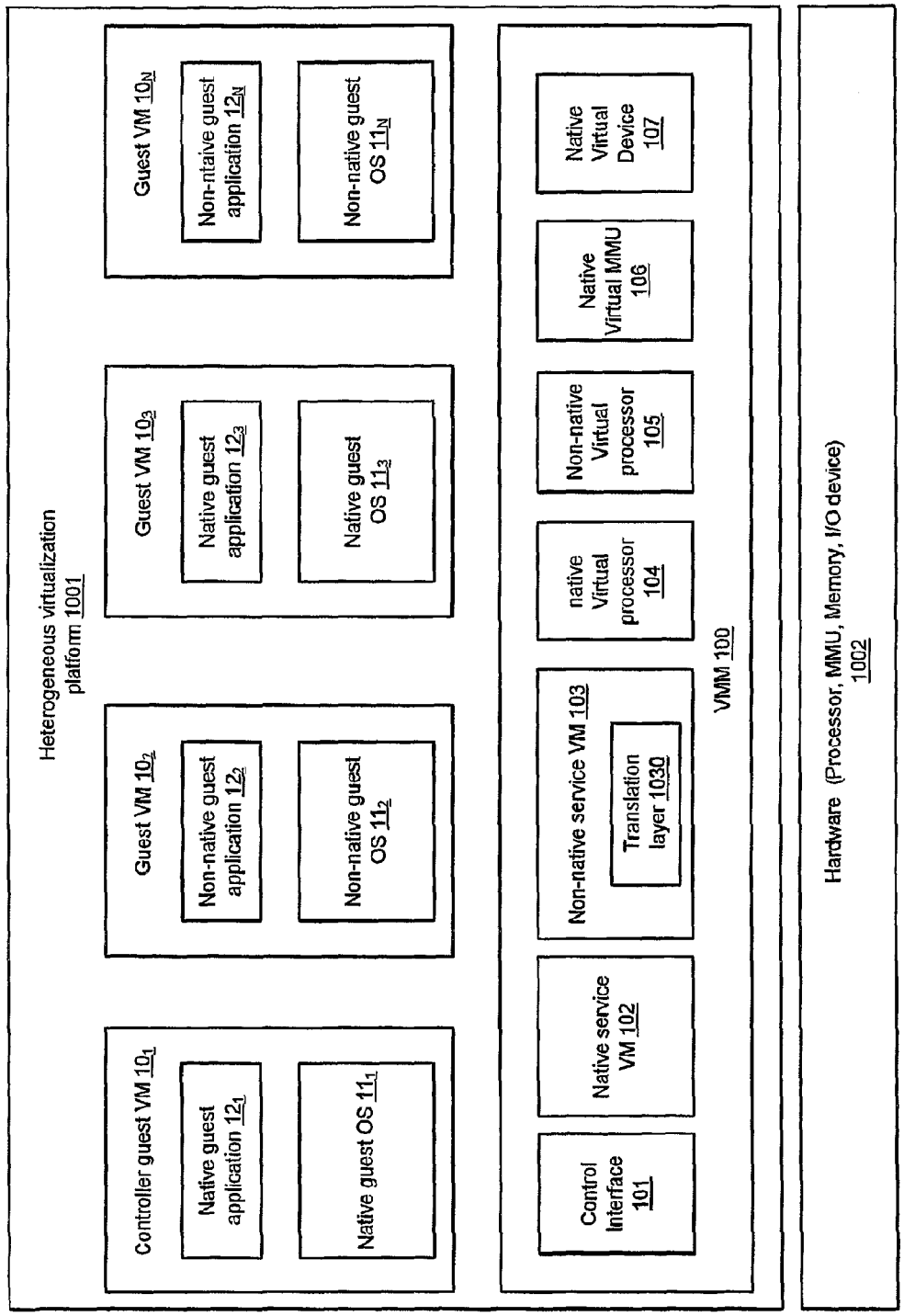
FIG. 1 shows an embodiment of a computer system comprising a heterogeneous virtualization platform.

An embodiment of a computer system 1000 supporting a heterogeneous virtualization technology is shown in FIG. 1. A non-exhaustive list of examples for the computer system 1000 may include mainframe computer, mini-computer, personal computer, portable computer, laptop computer and other devices for transceiving and processing data. The computer system 1000 may comprise a heterogeneous virtualization platform 1001 and underlying hardware machine 1002 supporting virtualization technology. The underlying hardware machine 1002 may be setup in compliance with host system architecture. Examples for the host system architecture may comprise a 64-bit system architecture such as Intel® Itanium™ system architecture, Intel® Pentium-M™ system architecture and Intel® Xeon™ system architecture, and possibly other system architecture.

The heterogeneous virtualization platform 1001 may comprise a virtual machine monitor 100 providing the virtualization capability on top of the hardware machine 1002 and a plurality of guest virtual machines $10_1$-$10_N$ created by the virtual machine monitor 100. Examples for the guest virtual machines may comprise modified guest virtual machine and unmodified guest virtual machine.

The plurality of guest virtual machines $10_1$-$10_N$ may run their own operating systems and application software. In the heterogeneous virtualization platform 1001 as shown in FIG. 1, at least one of the guest virtual machines $10_1$-$10_N$ (e.g., guest virtual machine $10_1$ and $10_3$) may comprise a native guest operating system (e.g., native guest OS $11_1$ and $11_3$) and a native guest application (e.g., native guest application $12_1$ and $12_3$) that support a guest system architecture native to the host system architecture, while at least one of the guest virtual machines $10_1$-$10_N$ (e.g., guest virtual machine $10_2$ and $10_N$) may comprise a non-native guest operating system (e.g., native guest OS $11_1$ and $11_3$) and a non-native guest application that support another guest system architecture non-native to the host system architecture, However, it should be appreciated that other embodiments may implement other technologies for the structure of the heterogeneous virtualization platform, for example, all of the guest virtual machines support non-native guest system architectures different from the host system architecture. Examples for the non-native guest system architecture may comprise a 32-bit system architecture such as Intel® x86 system architecture, Sun® SPARC™ system architecture, and IBM® Power™ system architecture, and possibly other system architecture.

In the embodiment shown in FIG. 1, the guest virtual machine $10_1$ may be used to control other guest virtual machines $10_2$-$10_N$, and therefore, may be further called as a controller guest virtual machine $10_1$. For example, the controller guest virtual machine $10_1$ may control device-related operations for other guest virtual machines.

The virtual machine monitor 100 may comprise a control interface 101, a native service virtual machine 102, a non-native service virtual machine 103, a native virtual processor 104, a non-native virtual processor 105, a native virtual memory management unit (MMU) 106, a native virtual device 107 and possibly other components.

The control interface 101 may be a user interface that may provide BIOS interface and data to the service virtual machines 102 and 103.

The native service virtual machine 102 may facilitate execution of a native guest operating system (e.g., native guest OS $11_1$) supporting the guest system architecture native to the host system architecture, and manage the virtualization of system resources for the native guest operating system at runtime. The native service virtual machine 102 may intercept an operating system boot loader, an interrupt handler, input/output, privileged Instructions and procedures dynamically through modifying runtime codes or back-patching.

The non-native service virtual machine 103 may facilitate execution of a non-native guest operating system (e.g. non-native guest OS $11_2$) supporting a guest system architecture non-native to the host system architecture, and manage the virtualization of system resources for the non-native guest operating system at runtime. Similarly with the native service virtual machine 102, the non-native service virtual machine 103 may intercept an operating system boot loader, an interrupt handler, input/output, privileged instructions and procedures dynamically through modifying runtime codes or back-patching.

In the embodiment, the non-native service virtual machine 103 may further comprise a translation layer 1030 to translate instructions from the non-native guest operating system complying with the non-native guest system architecture into instructions to be executed by the underlying hardware machine 1002 complying with the host system architecture and further facilitate virtualization environment for execution of the non-native guest operating system.

Since the translation layer loaded in the non-native service virtual machine 103 runs in a privileged level as the non-native service virtual machine 103 does (i.e., host ring level 0), the translation layer 1030 may be further provided with privileged instructions supporting privileged operations for accessing the system resources, such as control registers, debug registers, performance monitor unit, timer, interrupts, and possibly other resources. The translation layer may be further provided with data structures supporting the system resources that the privileged instructions may be able to access. For example, if the non-native guest system architecture is a 32-bit system architecture, the translation layer may comprise a 32-bit execution layer integrated with the above-described privileged instructions and data structures.

The native virtual processor 104 may fulfill virtualization of a processor supporting the host system architecture and the non-native virtual processor 104 may fulfill virtualization of a processor supporting the non-native guest system architecture. When stop or resume a guest operating system, the native virtual processor 104 or the non-native virtual processor 105 may save/restore native processor states or non-native processor states presented to the guest operating system. In the heterogeneous virtualization platform 1001, the underlying hardware processor may operate complying with the host system architecture and present native processor states, therefore, the translation layer 1030 may be responsible for mapping between the non-native processor states and native processor states in order to facilitate processor virtualization for execution of the non-native guest operating system.

The native virtual memory management unit (MMU) 106 may be responsible for emulating a native memory model for the guest operating systems, including address space assignment, virtual address translation, page table management, and so on. More specifically, the native virtual MMU 106 may translate native logical address supporting the host system architecture into native physical address, and maintain a native page table comprising the native physical address for each memory page complying with the host system architecture. In the heterogeneous virtualization platform 1001, the non-native guest operating system may maintain a non-native page table comprising the non-native physical address for each memory page complying with the non-native guest system architecture. Therefore, the translation layer 1030 may be further responsible for mapping between the non-native physical address in the non-native guest operating system and the native physical address in the virtual machine monitor in order to facilitate memory virtualization for execution of the non-native guest operating system.

The native virtual device 107 may fulfill virtualizations of devices for I/O operations in the guest operating systems. The native virtual device 107 may further support a native memory mapped I/O complying with the host system architecture, wherein the native memory mapped I/O may represent a native memory address of an entry of a special memory page that may store device ports in its entries. In the heterogeneous virtualization platform 1001, in order to facilitate device virtualization for execution of the non-native guest operating system that may execute either a non-native memory mapped I/O instruction or a non-native I/O instruction complying with the non-native guest system architecture for the I/O operation, the translation layer 1030 may be further responsible for mapping the non-native I/O instruction or the non-native memory mapped I/O instruction with the native memory mapped I/O instruction.

Other embodiments may implement other technologies for the structure of the heterogeneous virtualization system of FIG. 1. For example, the translation layer 1030 may support different non-native guest operating systems complying with different non-native guest system architectures. In such case, the translation layer may be provided with different capsules supporting instruction translation from the different guest system architectures to the host system architecture.

Figure 2:
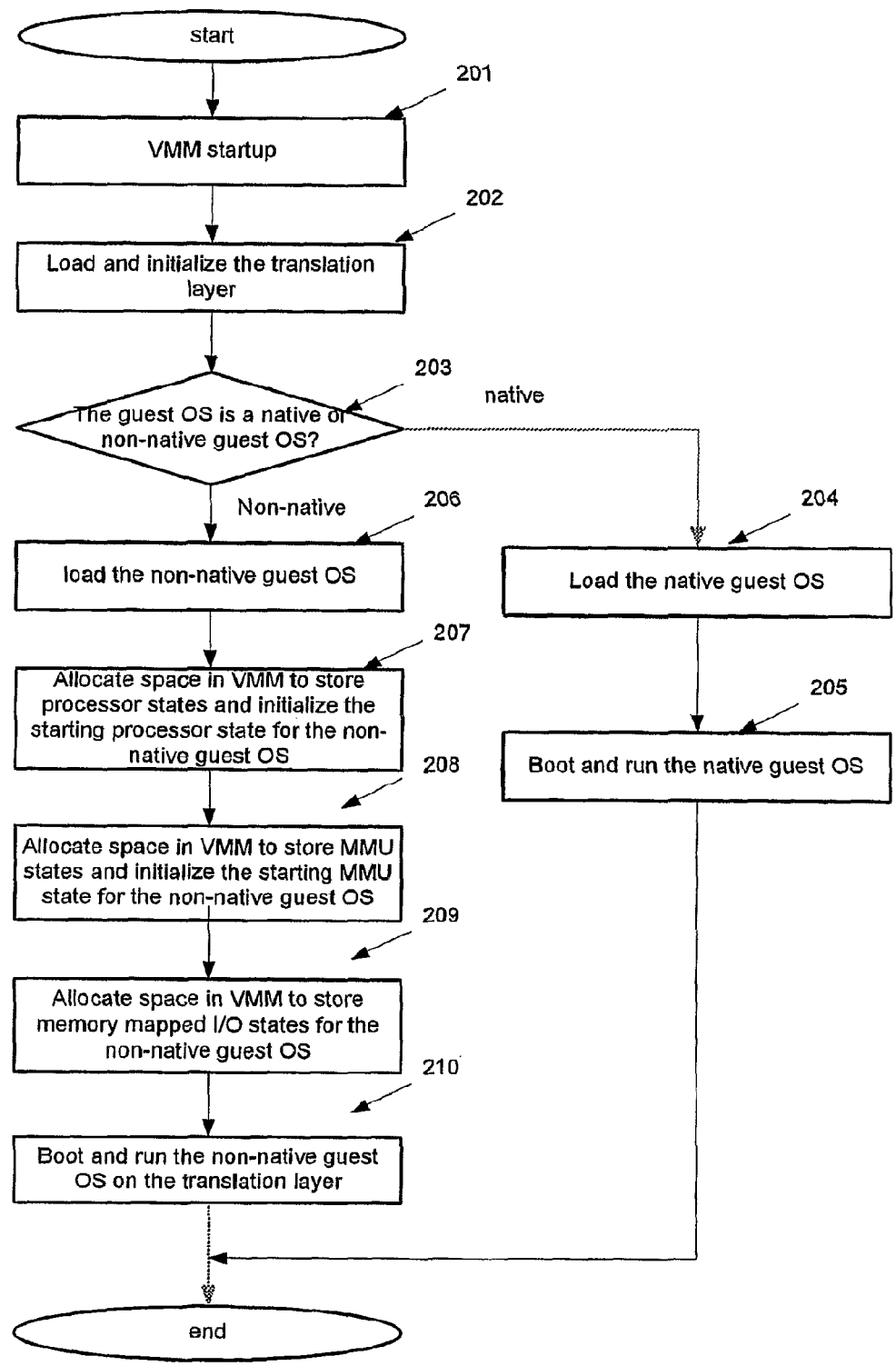
FIG. 2 shows an embodiment of a method of launching a guest operating system in the heterogeneous virtualization platform of FIG. 1.

FIG. 2 shows an embodiment of a method of launching a guest operating system in the heterogeneous virtualization platform of FIG. 1.

In block 201, the virtual machine monitor 1oo may start up and run at a privileged level (e.g., host ring 0) in the heterogeneous virtualization platform 1001. In block 202, user or any suitable device may load and initialize the translation layer 1030 in the virtual machine monitor 100. For example, the translation layer 1030 may be loaded in the non-native service virtual machine 103 of the virtual machine monitor 100, or other suitable places in the virtual machine monitor.

In block 203, the virtual machine monitor 100 or other suitable device may determine whether the guest operating system to be launched is a native guest operating system supporting native guest system architecture or non-native guest operating system supporting non-native guest system architecture. In response to a native guest operating system, the user or other suitable device may load the native guest operating system over the virtual machine monitor (block 204) and boot the native guest operating system to run at a de-privileged level (e.g., guest ring O) (block 205).

In response to non-native guest operating system, the user or other suitable device may load the non-native guest operating system over the virtual machine monitor (block 206) and call the virtual machine monitor 100 to implement the following blocks in order to launch the non-native guest operating system.

In block 207, the virtual machine monitor 100 may allocate space to store processor states for the non-native guest operating system and initialize the starting processor state. In the embodiment, the translation layer 1030 may map the non-native processor states into native processor states and extra processor states, and maintain a copy of the mapped processor states for the non-native guest operating system in the allocated space. Examples for the processor states may comprise the general registers, floating point registers, various kinds of control registers and flag or status registers. More details on mapping of the processor states would be given later with reference to FIGS. 3-4.

In block 208, the virtual machine monitor 100 may allocate space to store MMU states for the non-native guest operating system and initialize the starting MMU state. In the embodiment, the translation layer 1030 may maintain a copy of MMU states for the non-native operating system in the allocated space. Examples for the MMU states may comprise data structures to map a non-native memory address complying with the non-native guest system architecture into a native memory address complying with the host system architecture, a page table complying with the host system architecture, and possibly other MMU states. More details on mapping of the memory addresses would be given later with reference of FIGS. 5-7.

In block 209 the virtual machine monitor 100 may allocate space to store memory mapped I/O states for the non-native guest operating system and initialize the starting memory mapped I/O state. In the embodiment, the translation layer 1030 may maintain a copy of memory mapped I/O states for the non-native guest operating system in the allocated space. The memory mapped I/O states may comprise a memory page complying with the host system architecture that may store device ports in its entries, and memory address of each entry may represent each corresponding memory mapped I/O. Then, the translation layer 1030 may be further responsible for translating non-native guest I/O instructions or non-native guest memory mapped I/O instructions from the non-native guest operating system into native memory mapped I/O instructions, which may be further discussed in more details with reference to FIGS. 8-9.

In block 210, the virtual machine monitor 100 or other suitable device may boot the non-native guest OS to run on the translation layer 1030.

Other embodiment may implement other technologies of launching the operating system. For example, if one of the guest operating systems $11_1$-$11_N$ is used to manage device-related operations for other guest operating systems (for example, the native guest operating system $11_1$ of the controller guest virtual machine $10_1$), this guest operating system may be launched first, and device-related data for the other operating systems may be registered in this guest operating system when launching the other guest operating systems. For another example, the virtual machine monitor 100 may load the translation layer 1030 when finding that a guest operating system supporting the non-native guest system architecture runs on the top of it.

Figure 3:
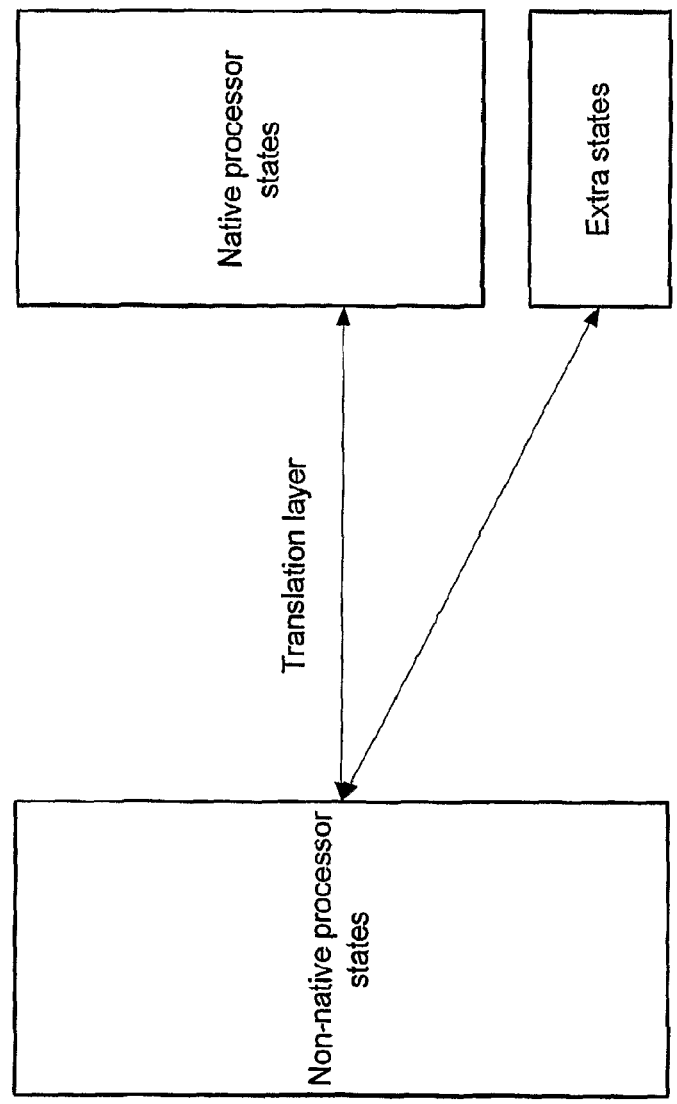
FIG. 3 shows an embodiment of mapping non-native processor states with native processor states by a translation layer of the heterogeneous virtualization system of FIG. 1.

An embodiment of mapping non-native processor states complying with the non-native guest system architecture by the translation layer 1030 is shown in FIG. 3.

As depicted, the translation layer 1030 may map non-native processor states of the non-native virtual processor 105 into native processor states of the native virtual processor 104. However, there is possibility that not all of the non-native processor states can be mapped with the native processor states. In such case, the translation layer 1030 may keep the non-native processor states that may not be mapped with the native processor states in the memory as extra states. Therefore, the copy of processor states maintained by the translation layer 1030 for each non-native guest operating system may comprise two parts, one for the native processor states that may be mapped with the non-native processor states while the other for the extra states representing the non-native processor states that may not be mapped with any of the native processor states.

Figure 4:
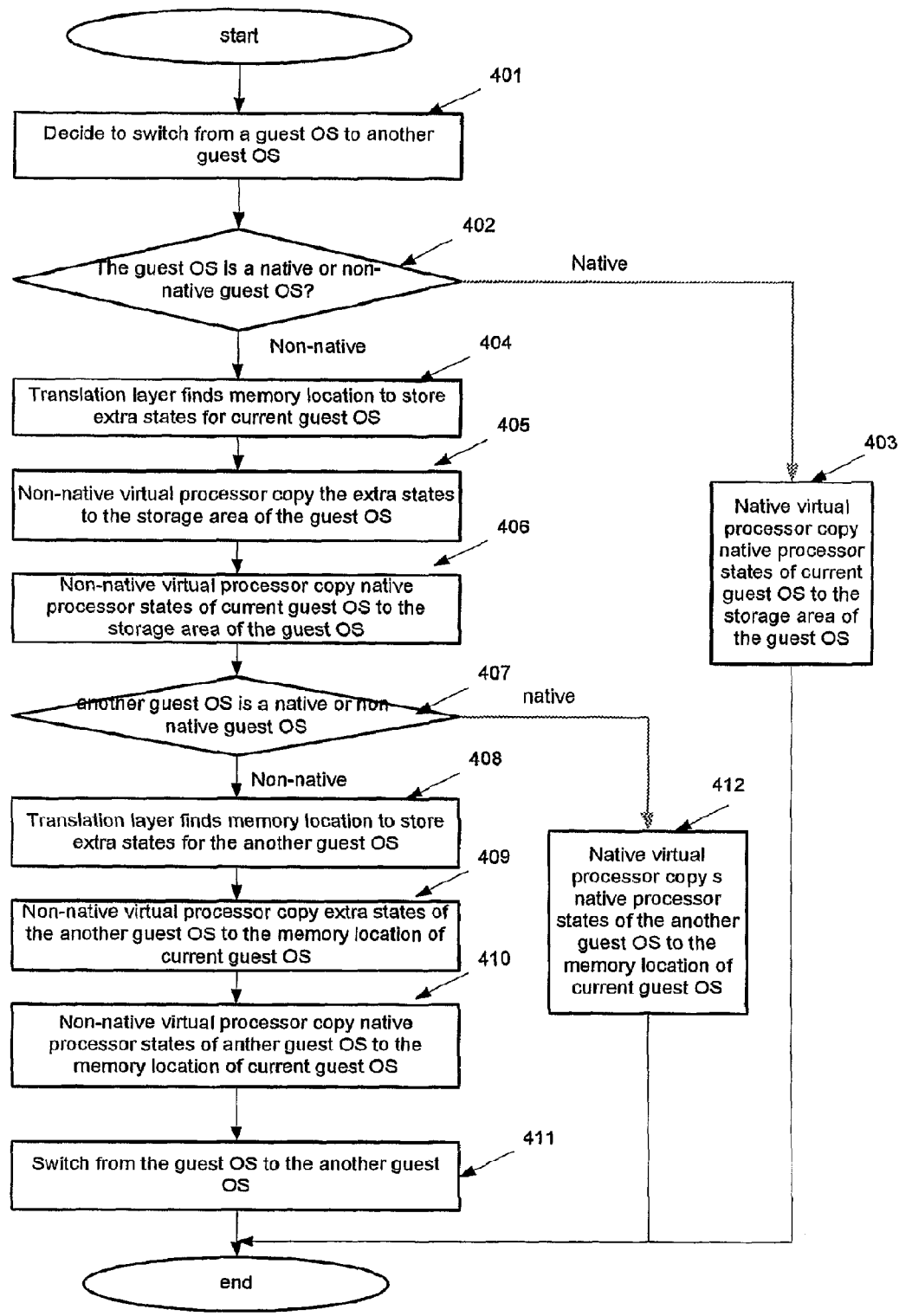
FIG. 4 shows an embodiment of a method of switching processes from a guest operating system to another guest operating system by utilizing the processor state mapping of FIG. 3.

With reference to FIG. 4, an embodiment of saving/restoring processor states by utilizing the above-stated processor state mapping method will be described under a presumption of switching processes from a guest operating system to another guest operating system. However, it may be appreciated that saving/restoring processor states for a guest operating system may happen as long as stopping or resuming the guest operating system.

As depicted, in block 401, it may be determined to switch processes from a guest operating system running as a current guest operating system to another guest operating system. Then, in block 402, the virtual machine monitor 100 or other suitable device may determine whether the guest operating system to be stopped is a native guest operating system or a non-native guest operating system. In response to determining that the guest operating system is a native guest operating system, the native virtual processor 104 or other suitable device may copy native processor states for the current guest operating system to the storage area allocated to store processor states for the guest operating system.

However, in response to determining that the guest operating system is a non-native, the virtual machine monitor 100 may call the translation layer 1030 to find memory location to store extra states for the current operating system in block 404. As stated above, the extra states may represent the non-native processor states that may not be mapped with any of the native processor states. Then, in block 405, the non-native virtual processor 105 or other suitable device may copy the extra states for the current guest operating system to the storage area allocated to store processor states for the guest operating system. In block 406, the non-native virtual processor 105 or other suitable device may further copy native processor states for the current operating system to the storage area for the guest operating system. As stated above, the native processor states may be mapped with corresponding non-native processor states.

Then, in block 407, the virtual machine monitor 100 or other suitable device may determine whether the another guest operating system to be resumed is a native or non-native guest operating system. In response to determining that the another guest operating system is a native guest operating system, the native virtual processor 104 may copy native processor states from a storage area allocated to store processor states for the another guest operating system to the memory location for the current operating system.

However, in response to determining that the another guest operating system is a non-native guest operating system, the virtual machine monitor 100 may call the translation layer 1030 to find memory location to store extra states for the another guest operating system in block 408, and the non-native virtual processor 105 may copy the extra states for the another guest operating system to the memory area allocated to store processor states for the current operating system in block 409. Then, in block 410, the non-native virtual processor 105 may copy native processor states for the another guest operating system to the memory area for the current operating system.

Finally, in block 411, the virtual machine monitor 100 or other suitable device may switch processes from the guest operating system to the another guest operating system.

Figure 5:
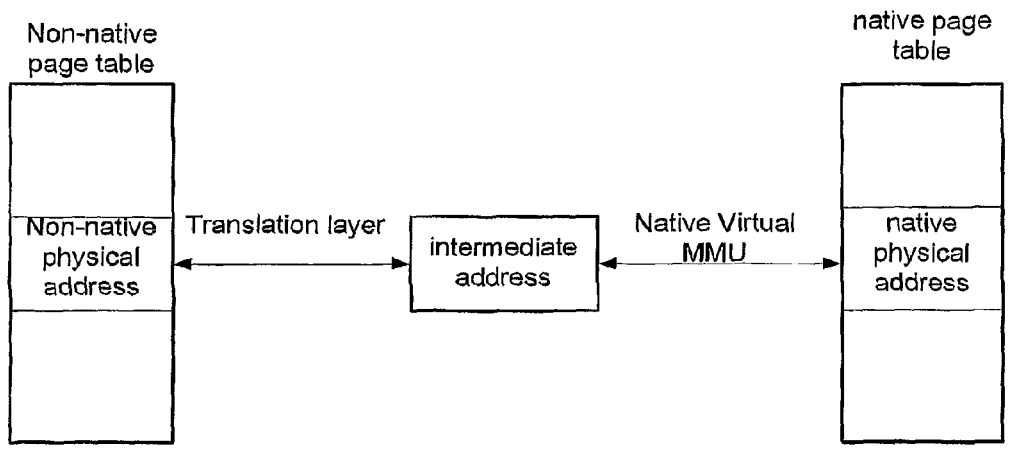
FIG. 5 shows an embodiment of translating a non-native physical address into a native physical address by utilizing the translation layer of the heterogeneous virtualization system of FIG. 1.

An embodiment of translating a non-native physical address into a native physical address by utilizing the translation layer 1030 is depicted in FIG. 5.

In the embodiment, a non-native guest operating system supporting the non-native guest system architecture may maintain a non-native page table. Each entry of the non-native page table may store a non-native physical address of each non-native memory page. Accordingly) the translation layer 1030 or other suitable device may maintain a native page table mappable with the non-native page table, wherein each entry of the native page table may store a native physical address of a native memory page complying with the host system architecture. Examples for the non-native page table may comprise virtual hashing page table (VHPT) for a 32-bit system architecture and examples for the native page table may comprise LVHPT (long-format VHPT) for a 64-bit system architecture. In order to translate the non-native physical address into the native physical address, the translation layer 1030 may generate an intermediate address complying with the host system architecture based upon the non-native physical address and the native virtual MMU 106 may translate the intermediate address into the native physical address by looking on the intermediate address as a native logical address.

Other embodiments may implement other technologies for address translation as shown in FIG. 5. For example, the translation layer 1030 may translate the non-native physical address into native physical address without the aid of the intermediate address. For another example, the translation layer 1030 may complete the address translation independently instead of depending upon the native virtual MMU 106.

Figure 6:
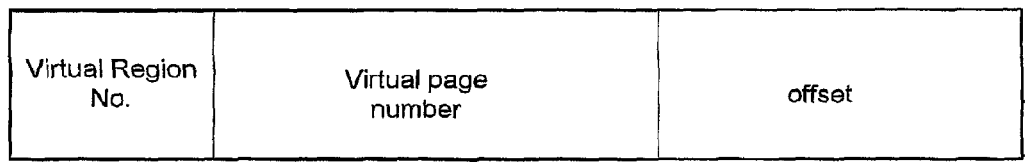
FIG. 6 shows an embodiment of an intermediate address for use in the address translation of FIG. 5.
Figure 6:
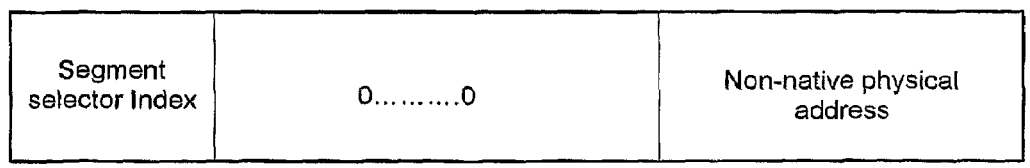

FIG. 6 depicts an embodiment of the intermediate address given that the non-native guest system architecture is a 32-bit architecture and the host system architecture is a 64-bit architecture. However, it should be appreciated that structure of the intermediate address may vary under different system architectures.

The upper part of FIG. 6 shows a data structure of a native logical address supporting the host system architecture, i.e., 64-bit system architecture. The top three bits of the 64-bit logical address (bits 61-63), i.e., virtual region number, may be used to index into an array of eight region registers maintained by the native virtual MMU, yielding a region ID. The remaining bits of the 64-bit logical address may form a virtual page number and an offset. The 64-bit system architecture may support sharing of translation lookup buffer (TLB) entries on a region basis, for example, the TLB may find corresponding physical page number based upon the region ID and virtual region number, which may result a 64-bit physical address formed of the physical page number and the offset in the 64-bit logical address. However, the non-native guest system architecture, i.e., 32-bit system architecture, may support address translation on a segmented basis. In other words, a logical address supporting the 32-bit system architecture may consist of a segment identifier and an offset, while the segment identifier is a 16-bit field called segment selector, and the offset is a 32-bit field. Under the 32-bit system architecture, the translation from the logical address into a 32-bit physical address may start from retrieving the segment selector from the logical address.

In view of above, the translation layer 1030 may generate an intermediate address under the 64-bit system architecture as depicted in the under part of FIG. 6. The translation layer 1030 may emulate the segmentation complying with 32-bit architecture with the region complying with 64-bit architecture, namely, different segment selectors may be represented by different regions and different segment selectors (cs:ds:fs:gs:es:ss) may be indexed with different virtual region numbers 0-5. Therefore, the top three bits of the intermediate address may present segment selector index 0-5 as virtual region number.

Further, the translation layer 1030 may embed the 32-bit physical address into one of the virtual page number and the offset of the 64-bit logical address and zero the other, resulting the intermediate address with 64-bits value following the 64-bit system architecture.

Figure 7:
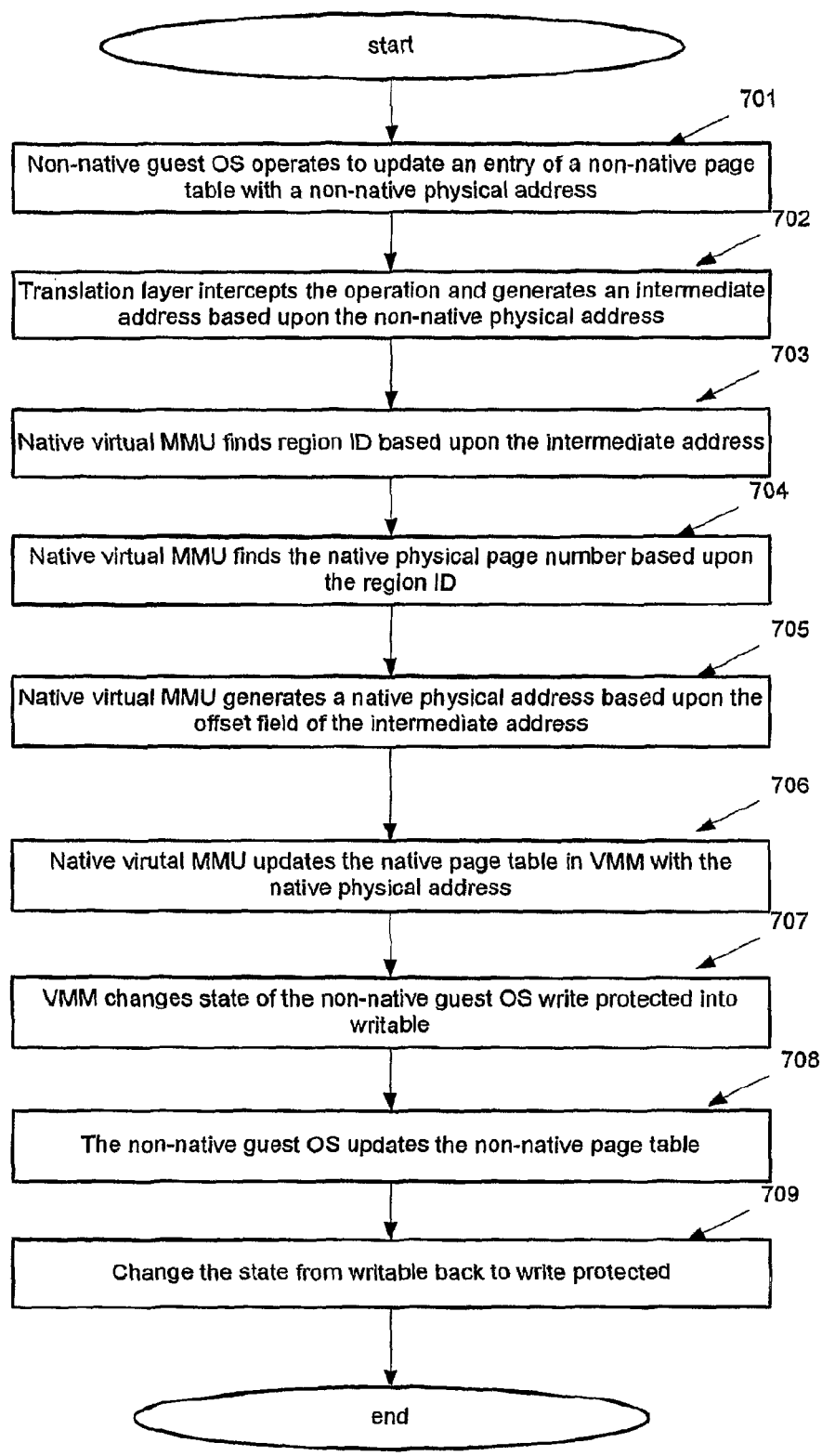
FIG. 7 shows an embodiment of a method of updating a non-native page table maintained in a non-native guest operating system by utilizing the address translation of FIG. 5.

FIG. 7 depicts an embodiment of a method of updating a non-native page table maintained by a non-native guest operating system with use of the address translation of FIGS. 5-6. However, it should be appreciated that the address translation may be adopted in other applications besides updating the non-native page table.

In block 701, the non-native guest operating system supporting the non-native guest system architecture may operate to update an entry of a non-native page table with a non-native physical address. In block 702, the translation layer 1030 may intercept the operation when the non-native guest operating system tries to access the control register where the translation layer 1030 may have the privileged right to access. The translation layer 1030 may then generate an intermediate address complying with the host system architecture based upon the non-native physical address complying with the non-native guest system architecture.

In block 703, the native virtual MMU 106 may obtain a region 10 by retrieving the virtual region number from the intermediate address and then find a physical page number based upon the region ID and virtual page number in the intermediate address in block 704.

Then, in supporting the host system architecture block 705, the native virtual MMU 106 may generate a native physical address complying with the host system architecture based upon the physical page number obtained in block 704 and the offset field of the intermediate address. In block 706, the native virtual MMU 106 may update a native page table maintained in the virtual machine monitor 100 for the non-native guest operating system with the generated native physical address. It can be seen that the native page table in the virtual machine monitor 100 may correspond to the non-native page table in the non-native guest operating system, wherein each non-native physical address stored in the non-native page table mappable with each native physical address stored in the native page table.

In block 707, the virtual machine monitor 100 or other suitable device may change a page table state for the non-native guest operating system from write protected state into writable state so that the non-native guest operating system may update the entry of the non-native page table with the non-native physical address in block 708. Finally, in block 709, the virtual machine monitor 100 or other suitable device may change the page table state back into write protected state, so that any future operations of updating the non-native page table by the non-native guest operating system may be intercepted again.

Figures 8A, 8B, 8C:
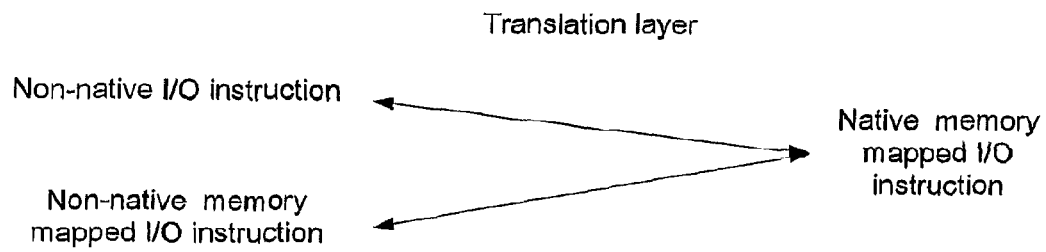
FIG. 8A shows an embodiment of translating a non-native I/O instruction or a non-native memory I/O instruction into a native memory mapped I/O instruction by the translation layer of the heterogeneous virtualization platform of FIG. 1.
FIG. 8B shows an embodiment of a port-address table
FIG. 8C shows an embodiment of an address-address table.

Other embodiments may implement other technologies for address translation as shown in FIG. 7. For example, the translation layer 1030 may be able to translate the non-native physical address into native physical address with the aid of the intermediate address in other structures or without the aid of the intermediate address at all. In such case, blocks 702-705 for generating the native physical address may be modified accordingly. For another example, if the non-native guest system architecture and host system architecture are different from 32-bit and 64-bit system architectures, blocks 702-705 may be modified accordingly FIG. 8A shows an embodiment of translating a non-native I/O instruction or non-native memory mapped I/O instruction complying with the non-native guest system architecture into native memory mapped I/O complying with the host system architecture.

In the embodiment, a special native memory page may be allocated for each non-native guest operating system and store native device ports in its entries. A native memory mapped I/O may be represented by a native memory address of the native page entry storing the native device port. However, the non-native guest operating system may itself maintain a non-native memory page corresponding to the native memory page and the non-native memory mapped I/O may be represented by a non-native memory address of the non-native page entry storing the non-native device port.

The non-native guest operating system may perform a device related I/O operation by executing a non-native instruction such as a non-native I/O instruction or a non-native memory mapped I/O instruction, wherein the non-native I/O instruction may comprise a non-native device port number while the non-native memory I/O instruction may comprise a non-native memory address of an entry in the non-native memory page storing the non-native device port number. The translation layer 1030 may intercept the non-native instruction from the non-native guest operating system and translate the non-native instruction into the native memory mapped I/O instruction complying with the host system architecture. For the non-native I/O instruction, the translation layer 1030 may extract the non-native device port number from the instruction, and translate the non-native device port number into the native memory address storing the corresponding native device port number with reference to a port-address table maintained by the native virtual device 107. FIG. 8B shows an example of the port-address table. The table may comprise two columns, one for the non-native device port number and the other for the native memory address. For the non-native memory mapped I/O instruction, the translation layer 1030 may extract the non-native memory address from the instruction, and translate the non-native memory address into the native memory address storing the corresponding native port number with reference to an address-address table maintained by the native virtual device 107. FIG. 8C shows an example the address-address table. The table may comprise two columns, one for the non-native memory address and the other for the native memory address.

Figure 9:
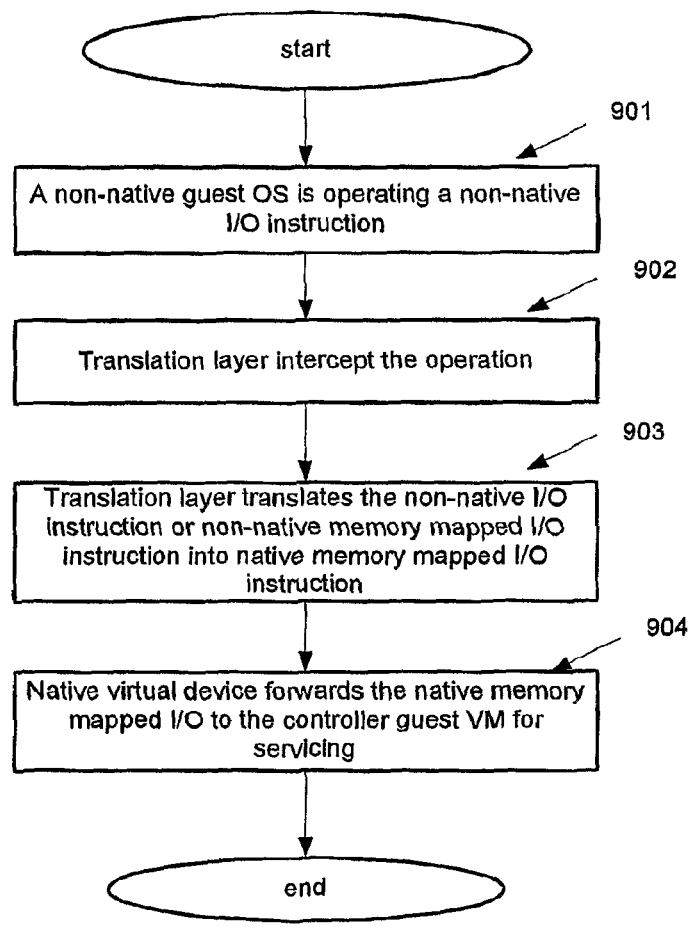
FIG. 9 shows an embodiment of a method of servicing an I/O operation for a non-native guest operating system in the heterogeneous virtualization platform of FIG. 1.

FIG. 9 shows an embodiment of a method of servicing an I/O operation for a non-native guest operating system in the heterogeneous virtualization platform of FIG. 1

In block 901, the non-native operating system supporting the non-native guest system architecture is executing a non-native instruction for a device related 110 operation, for example, input/output data to/from a device. In block 902, the translation layer 1030 operating in a privileged level may intercept the non-native instruction from the non-native guest operating system since the non-native guest operating system is de-privileged. Then, the translation layer 1030 may translate the non-native instruction into the native memory mapped I/O instruction in block 903. The translation may vary in accordance with the non-native instruction in different forms, e.g., non-native I/O instruction or non-native memory mapped I/O instruction, as stated above with reference to FIGS. 8A-8C.

The heterogeneous virtualization platform may comprise a plurality of guest virtual machines, one of which may be a controller guest virtual machine responsible for managing device related I/O operations in other guest virtual machines. In this context, the native virtual device 107 may forward the native memory mapped I/O to the controller guest virtual machine for I/O servicing in block 904.

Figure 10:
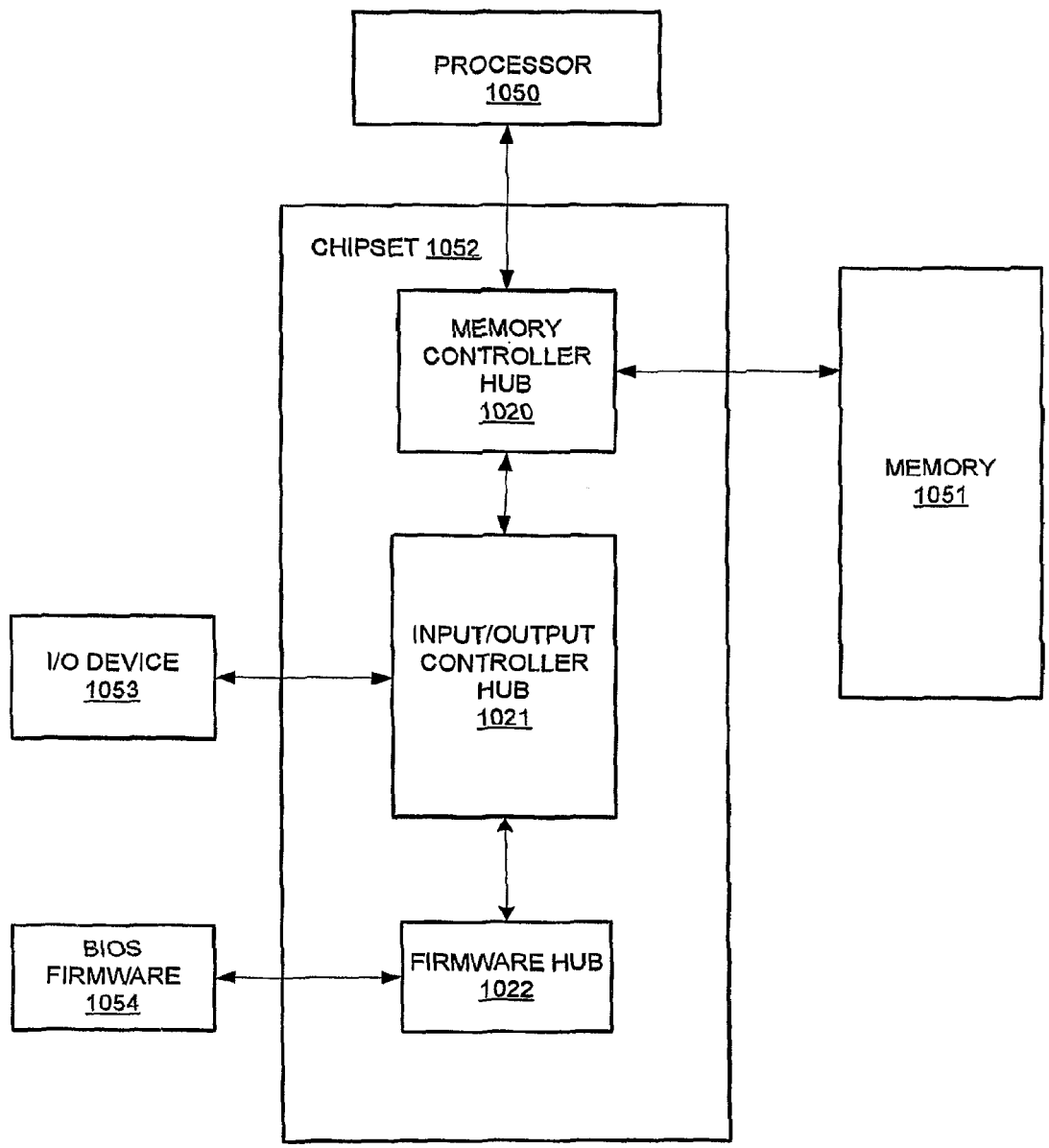
FIG. 10 shows an embodiment of a general computer system implementing the heterogeneous virtualization of FIG. 1.

FIG. 10 depicts an embodiment of a general computer system implementing the heterogeneous virtualization as shown in FIG. 1. The computing platform may comprise one or more processors 1050, memory 1051, chipset 1052, I/O device 1053, BIOS firmware 1054 and possibly other components. The one or more processors 1050 are communicatively coupled to various components (e.g., the memory 1051) via one or more buses such as a processor bus. The processors 1050 may be implemented as an integrated circuit (IC) with one or more processing cores that may execute codes complying with a host system architecture, for example, including Intel® Xeon™, Intel® Pentium™, Intel® Itanium™ architectures, available from Intel Corporation of Santa Clara, Calif.

In an embodiment, the memory 1051 may store codes to be executed by the processor 1050. A non-exhaustive list of examples for the memory 1051 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

In an embodiment, the chipset 1052 may provide one or more communicative path among the processor 1050, memory 1051 and various components, such as the I/O device 1053 and BIOS firmware 1054. The chipset 1052 may comprise a memory controller hub 1020, an input/output controller hub 1021 and a firmware hub 1022.

In an embodiment, the memory controller hub 1020 may provide a communication link to the processor bus that may connect with the processor 1050 and to a suitable device such as the memory 1051. The memory controller hub 1020 may couple with the I/O controller hub 1021 that may provide an interface to the I/O devices 1053 for the computing platform such as a keyboard and a mouse. A non-exhaustive list of examples for the I/O devices 1053 may comprise a keyboard, mouse, network card, a storage device, a camera, a blue-tooth, an antenna, and the like.

In an embodiment, the memory controller hub 1020 may communicatively couple with a firmware hub 1022 via the input/output controller hub 1021. The firmware hub 1022 may couple with the BIOS firmware 1054 that may store routines that the computing platform executes during system startup in order to initialize the processors 1050, chipset 1052, and other components of the computing platform. Moreover, the BIOS firmware 1054 may comprise routines or drivers that the computing platform may execute to communicate with one or more components of the compute platform.

The computer system as depict in FIG. 10 may perform as the computer system 1000 as depicted in FIG. 1. The memory 1051 may store software images as a virtual machine monitor including the control interface 101, the native service virtual machine 102, the non-native service virtual machine 103 including the translation layer 1030, the native virtual processor 104, the non-native virtual processor 105, the native virtual MMU 106 and the native virtual device 107, and possibly other components. The memory 1051 may further store guest software including guest operating system and guest applications.

Other embodiments may implement other technologies for the structure of the computer platform as shown in FIG. 10. For example, the memory controller hub 1020 may be embedded into the processor 1050 by providing a processor containing on-die memory controller While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
executing a host operating system according to a host system architecture of a first register size;
executing a guest operating system according to a guest system architecture having registers of a second size different from said first size;
translating instructions from the guest operating system into instructions that run on the host operating system;
extracting guest operating system device port numbers from guest operating system instructions;
translating the guest operating system device port number into a host machine operating system memory address;
mapping processor states of a first virtual processor supporting the guest system architecture with processor states of second virtual processor supporting the host system architecture; and
storing the processor states of the first virtual processor that are not mapped with the processor states of the second virtual processor.

2. The method of claim 1, wherein the guest system architecture has a second register size that is 32-bits and host system architecture has a 64-bit register size.

3. The method of claim 1, including a plurality of guest operating systems including one guest operating system emulating the host system architecture.

4. The method of claim 3, including using privileged instructions to access system resources.

5. The method of claim 1, including mapping a physical address supporting the guest system architecture with a physical address supporting the host system architecture.

6. The method of claim 1, including generating an intermediate address complying with the host system architecture based upon a physical address complying with the guest system architecture, and emulating a segment selector with a region for a native virtual memory management unit of the virtual machine monitor to translate the intermediate address into a physical address complying with the host system architecture.

7. The method of claim 1, including translating one of an I/O instruction and a memory mapped I/O instruction complying with the guest system architecture into a memory mapped I/O instruction complying with the host system architecture.

8. A non-transitory computer readable medium storing instructions executed by a computer to:
execute a host operating system according to a host system architecture of a first register size;
execute a guest operating system according to a guest system architecture having registers of a second size different from said first size;
translate instructions from the guest operating system into instructions that run on the host operating system;
extract guest operating system device port numbers from guest operating system instructions;
translate the guest operating system device port number into a host machine operating system memory address;
map processor states of a first virtual processor supporting the guest system architecture with processor states of second virtual processor supporting the host system architecture; and
store the processor states of the first virtual processor that are not mapped with the processor states of the second virtual processor.

9. The medium of claim 8, wherein the guest system architecture has a second register size that is 32-bits and host system architecture has a 64-bit register size.

10. The medium of claim 8, further storing instructions to emulate the host system architecture using a guest operating system.

11. The medium of claim 10, further storing instructions to use privileged instructions to access system resources.

12. The medium of claim 8, further storing instructions to map a physical address supporting the guest system architecture with a physical address supporting the host system architecture.

13. The medium of claim 8, further storing instructions to generate an intermediate address complying with the host system architecture based upon a physical address complying with the guest system architecture, and emulate a segment selector with a region for a native virtual memory management unit of the virtual machine monitor to translate the intermediate address into a physical address complying with the host system architecture.

14. The medium of claim 8, further storing instructions to translate one of an I/O instruction and a memory mapped I/O instruction complying with the guest system architecture into a memory mapped I/O instruction complying with the host system architecture.

* * * * *